(12) United States Patent
Nakaya

(10) Patent No.: US 11,933,382 B2
(45) Date of Patent: Mar. 19, 2024

(54) VOLUME CHANGE COMPENSATION DEVICE AND DAMPER DEVICE

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 142 days.

(21) Appl. No.: 17/437,538

(22) PCT Filed: Mar. 17, 2020

(86) PCT No.: PCT/JP2020/011809
§ 371 (c)(1),
(2) Date: Sep. 9, 2021

(87) PCT Pub. No.: WO2020/217785
PCT Pub. Date: Oct. 29, 2020

(65) Prior Publication Data
US 2022/0145959 A1    May 12, 2022

(30) Foreign Application Priority Data
Apr. 26, 2019  (JP) .................................. 2019-085314

(51) Int. Cl.
*F16F 9/52*   (2006.01)
*F16F 9/14*   (2006.01)

(52) U.S. Cl.
CPC ................ *F16F 9/52* (2013.01); *F16F 9/145* (2013.01); *F16F 2222/12* (2013.01); *F16F 2232/02* (2013.01); *F16F 2236/106* (2013.01)

(58) Field of Classification Search
CPC .......... F16F 9/52; F16F 9/145; F16F 2222/12; F16F 2232/02; F16F 2236/106
See application file for complete search history.

(56) References Cited

U.S. PATENT DOCUMENTS 1,888,716  A  *  11/1932  Ford ....................... F16F 9/145
                                                188/290
2,043,465  A  *  6/1936  Clifford .................. F16F 9/145
                                                188/278

(Continued)

FOREIGN PATENT DOCUMENTS

CN      109578492 A      4/2019
DE    102009050847 A1    4/2011

(Continued)

OTHER PUBLICATIONS

International Search Report dated Jun. 9, 2020 filed in PCT/JP2020/011809.

(Continued)

*Primary Examiner* — Xuan Lan Nguyen
(74) *Attorney, Agent, or Firm* — PEARNE & GORDON LLP

(57) ABSTRACT

Provided are a volume change compensation device capable of reducing a manufacturing burden with a simple configuration and a damper device including the volume change compensation device. A damper device 100 includes a rotary damper, and includes a volume change compensation device 140 in a shaft 121 of a rotor 120. The volume change compensation device 140 includes an inner cylinder piston 142 pressed by an inner cylinder piston pressing elastic body 145 in a body tube 141 communicating with a hydraulic fluid housing portion 103 of the damper device 100 through a connection path 141a. The inner cylinder piston 142 is formed in a bottomed cylindrical shape opening on a connection path 141a side. In the inner cylinder piston 142, an inner cylinder inner small piston 143 is pressed against a bottom portion 142b by a small piston pressing elastic body 144. An air hole 142c is formed at the bottom portion 142b of the inner cylinder piston 142. The inner cylinder inner (Continued)

small piston 143 slides in the inner cylinder piston 142 according to the amount of hydraulic fluid 150 in the inner cylinder piston 142.

14 Claims, 6 Drawing Sheets

(56) References Cited

U.S. PATENT DOCUMENTS

| | | | | |
|---|---|---|---|---|
| 2,046,626 | A * | 7/1936 | Herrmann | F16F 9/145 |
| | | | | 188/309 |
| 2,419,651 | A | 4/1947 | Magrum | |
| 3,038,561 | A * | 6/1962 | Rumsey | F16F 9/145 |
| | | | | 188/278 |
| 5,901,821 | A | 5/1999 | Hanawa | |
| 8,261,894 | B2 * | 9/2012 | Kanno | F16F 9/14 |
| | | | | 188/308 |
| 8,516,657 | B2 * | 8/2013 | Yoshida | A47K 13/12 |
| | | | | 188/293 |
| 9,321,491 | B2 * | 4/2016 | Horita | B62D 33/027 |
| 2010/0205774 | A1 | 8/2010 | Yoshida | |

FOREIGN PATENT DOCUMENTS

| | | |
|---|---|---|
| DE | 102015212935 A1 | 1/2017 |
| JP | H06-051039 U | 7/1994 |
| JP | H09-264363 A | 10/1997 |
| JP | H11-082593 A | 3/1999 |
| JP | 2000-230598 A | 8/2000 |
| JP | 2006-144863 A | 6/2006 |
| JP | 6474479 B1 | 2/2019 |

OTHER PUBLICATIONS

Extended European Search Report dated Dec. 23, 2022, for the corresponding European Patent Application No. 20796183.0.

* cited by examiner

VOLUME CHANGE COMPENSATION DEVICE AND DAMPER DEVICE

TECHNICAL FIELD

The present invention relates to a volume change compensation device and a damper device including the volume change compensation device. The volume change compensation device is connected to a hydraulic fluid housing portion liquid-tightly housing liquid to compensate for a change in the volume of the liquid.

BACKGROUND ART

Typically, in a four-wheeled or two-wheeled self-propelled vehicle or industrial mechanical equipment, a rotary damper has been used as a kinetic energy damping device in a turning mechanism. For example, a rotary damper disclosed in Patent Literature 1 below includes two damping force generation elements having different damping properties. In this rotary damper, damping force is different between forward rotation and reverse rotation of a rotor. In this case, in the rotary damper, a damper device temperature compensation mechanism including a volume change compensation device as a volume change compensation device is provided to compensate for a change in the volume of hydraulic fluid due to a temperature change.

CITATION LIST

Patent Literature

PATENT LITERATURE 1: JP-A-11-82593

SUMMARY OF INVENTION

However, the temperature compensation mechanism in the rotary damper as disclosed in Patent Literature 1 above compensates for a change in the volume of the hydraulic fluid by a change in the volume of gas sealed in a gas chamber. Thus, there are the following problems. That is, a configuration is complicated. Further, a manufacturing burden in terms of a process and an economy for producing a structure for airtightly holding gas with a favorable accuracy is great.

The present invention has been made to cope with the above-described problems. An object of the present invention is to provide a volume change compensation device capable of reducing the manufacturing burden with a simple configuration and a damper device including the volume change compensation device.

In order to achieve the object described above, the feature of the present invention is a volume change compensation device connected to a hydraulic fluid housing portion liquid-tightly housing hydraulic fluid including liquid to compensate for a change in a volume of the hydraulic fluid, including: a body tube formed in a tubular shape, communicating with the hydraulic fluid housing portion at one opening, and housing part of the hydraulic fluid; an inner cylinder piston formed in a bottomed cylindrical shape and slidably provided along an axis direction in a state in which the part of the hydraulic fluid is housed in the body tube; an inner cylinder inner small piston slidably provided along the axis direction in the inner cylinder piston; and an inner cylinder piston pressing elastic body provided on an opposite side of the inner cylinder piston from a side of the one opening in the body tube and elastically pressing the inner cylinder piston toward the one opening side. The inner cylinder piston is, in the body tube, arranged in such an orientation that the inner cylinder piston opens to the one opening side, and an air hole for an air flow into the inner cylinder piston is formed at a bottom portion of the inner cylinder piston facing the inner cylinder inner small piston.

According to the feature of the present invention configured as described above, the volume change compensation device can mainly compensate for the decrement of the volume of the hydraulic fluid in the hydraulic fluid housing portion by the hydraulic fluid housed in the inner cylinder piston, and can mainly compensate for the increment of the volume of the hydraulic fluid in the hydraulic fluid housing portion by the capacity of the body tube. That is, the volume change compensation device according to the present invention can compensate for a change in the volume of the hydraulic fluid only by means of the hydraulic fluid as fluid housed in the hydraulic fluid housing portion. Thus, the volume change compensation device according to the present invention can reduce the manufacturing burden with the simple configuration.

Another feature of the present invention is that the volume change compensation device further includes a small piston pressing elastic body provided in the inner cylinder piston and elastically pressing the inner cylinder inner small piston to a bottom portion side.

According to another feature of the present invention configured as described above, in the volume change compensation device, the inner cylinder inner small piston can be forcibly positioned on the bottom portion side of the inner cylinder piston by the small piston pressing elastic body. Thus, when the inner cylinder piston is charged with the hydraulic fluid, the hydraulic fluid can be reliably charged to the capacity limit of the inner cylinder piston. That is, in the volume change compensation device, the amount of compensation for the decrement of the volume of the hydraulic fluid in the hydraulic fluid housing portion can be maximized. Moreover, in the volume change compensation device, even when the inner cylinder piston is charged with the hydraulic fluid under an atmospheric pressure on, e.g., a customer side, the inner cylinder inner small piston can be forcibly positioned on the bottom portion side of the inner cylinder piston by the small piston pressing elastic body when air is released from the inner cylinder after the inner cylinder piston has been reciprocatably displaced. This can prevent air from remaining in the inner cylinder piston.

Still another feature of the present invention is that the volume change compensation device further includes an extending body extending in a bar shape from the bottom portion of the inner cylinder piston and exposed through an opening of the body tube on the opposite side.

According to still another feature of the present invention configured as described above, the volume change compensation device includes the extending body extending in the bar shape from the bottom portion of the inner cylinder piston and exposed through the opening of the body tube on the opposite side. Thus, the position of the inner cylinder piston in the body tube can be easily grasped by the amount of exposure of the extending body from the body tube. That is, in the volume change compensation device, the status of the volume and temperature of the hydraulic fluid in the hydraulic fluid housing portion can be shown to the outside by the amount of exposure of the extending body from the body tube.

In the volume change compensation device, when the inner cylinder piston is charged with the hydraulic fluid under the atmospheric pressure, the extending body protruding from the body tube is operated to move back and forth. In this manner, air can be discharged from the inner cylinder piston, and residual air can be prevented.

Still another feature of the present invention is that the volume change compensation device further includes a fixing tool configured to fix the inner cylinder inner small piston to the bottom portion of the inner cylinder piston.

According to still another feature of the present invention configured as described above, in the volume change compensation device, the inner cylinder inner small piston can be integrally fixed to the bottom portion of the inner cylinder piston by the fixing tool. Thus, when the inner cylinder piston is charged with the hydraulic fluid, the hydraulic fluid can be reliably charged to the capacity limit of the inner cylinder piston. Moreover, in the volume change compensation device, even when the inner cylinder piston is charged with the hydraulic fluid under the atmospheric pressure, the inner cylinder inner small piston can be fixed to the bottom portion of the inner cylinder piston by the fixing tool. This can prevent air from remaining in the inner cylinder piston.

The present invention can be implemented not only as the invention of the volume change compensation device but also as the invention of the damper device including the volume change compensation device.

Specifically, it is preferred that the damper device includes the volume change compensation device according to any one of claims 1 to 4, the damper device including a hydraulic fluid housing portion liquid-tightly housing hydraulic fluid including liquid and a hydraulic fluid pressing body sliding in the hydraulic fluid housing portion while pushing the hydraulic fluid and damping force input to the hydraulic fluid pressing body by a flow of the hydraulic fluid.

According to the feature of the present invention configured as described above, the damper device can mainly compensate for the decrement of the volume of the hydraulic fluid in the hydraulic fluid housing portion by the hydraulic fluid housed in the inner cylinder piston, and can mainly compensate for the increment of the volume of the hydraulic fluid in the hydraulic fluid housing portion by the capacity of the body tube. That is, the damper device according to the present invention can compensate for a change in the volume of the hydraulic fluid only by means of the hydraulic fluid as fluid housed in the hydraulic fluid housing portion. Thus, the damper device according to the present invention can reduce the manufacturing burden with the simple configuration.

Further, in this case, it is preferred that in the damper device, the damper device includes a rotary damper, and the rotary damper includes a housing having the hydraulic fluid housing portion formed in a cylindrical shape and having, in the hydraulic fluid housing portion, a fixed vane formed in a wall shape along a radial direction, dividing an inside of the hydraulic fluid housing portion, and interfering with a flow of the hydraulic fluid in a circumferential direction, and includes, at an outer peripheral portion of a shaft, a rotor having a movable vane dividing the inside of the hydraulic fluid housing portion and turning while pushing the hydraulic fluid.

According to still another feature of the present invention configured as described above, in the damper device, the rotary damper can compensate for a change in the volume of the hydraulic fluid. This rotary damper includes the housing having the hydraulic fluid housing portion formed in the cylindrical shape and having, in the hydraulic fluid housing portion, the fixed vane formed in the wall shape along the radial direction, dividing the inside of the hydraulic fluid housing portion, and interfering with the flow of the hydraulic fluid in the circumferential direction, and includes, at the outer peripheral portion of the shaft, the rotor having the movable vane dividing the inside of the hydraulic fluid housing portion and turning while pushing the hydraulic fluid.

In this case, in the damper device, the volume change compensation device may be formed inside the shaft forming the rotor.

According to still another feature of the present invention configured as described above, in the damper device, the volume change compensation device is formed inside the shaft forming the rotor. Thus, the damper device can be efficiently formed and be reduced in size.

Further, in these cases, it is preferred that in the damper device, the shaft forming the rotor has a communication path allowing the hydraulic fluid to flow between at least two cells divided by the fixed vane in the hydraulic fluid housing portion, and the body tube of the volume change compensation device communicates with the hydraulic fluid housing portion through the communication path.

According to still another feature of the present invention configured as described above, in the damper device, the volume change compensation device communicates with the hydraulic fluid housing portion through the communication path formed at the shaft forming the rotor. Thus, the damper device can be efficiently formed and be reduced in size.

In this case, in the damper device, in expected main temperature environment for the damper device, the inner cylinder piston may be filled with the hydraulic fluid to a capacity limit.

According to still another feature of the present invention configured as described above, in the damper device, the inner cylinder piston is filled with the hydraulic fluid to the capacity limit in the expected main temperature environment for the damper device. Thus, compensation for the decrement of the volume of the hydraulic fluid can be maximized. The main temperature environment as described herein is a temperature that the time of exposure of the damper device is longest in a temperature range in use environment where the damper device is placed or the median of the temperature range in the use environment.

DESCRIPTION OF EMBODIMENTS

Figure 1:
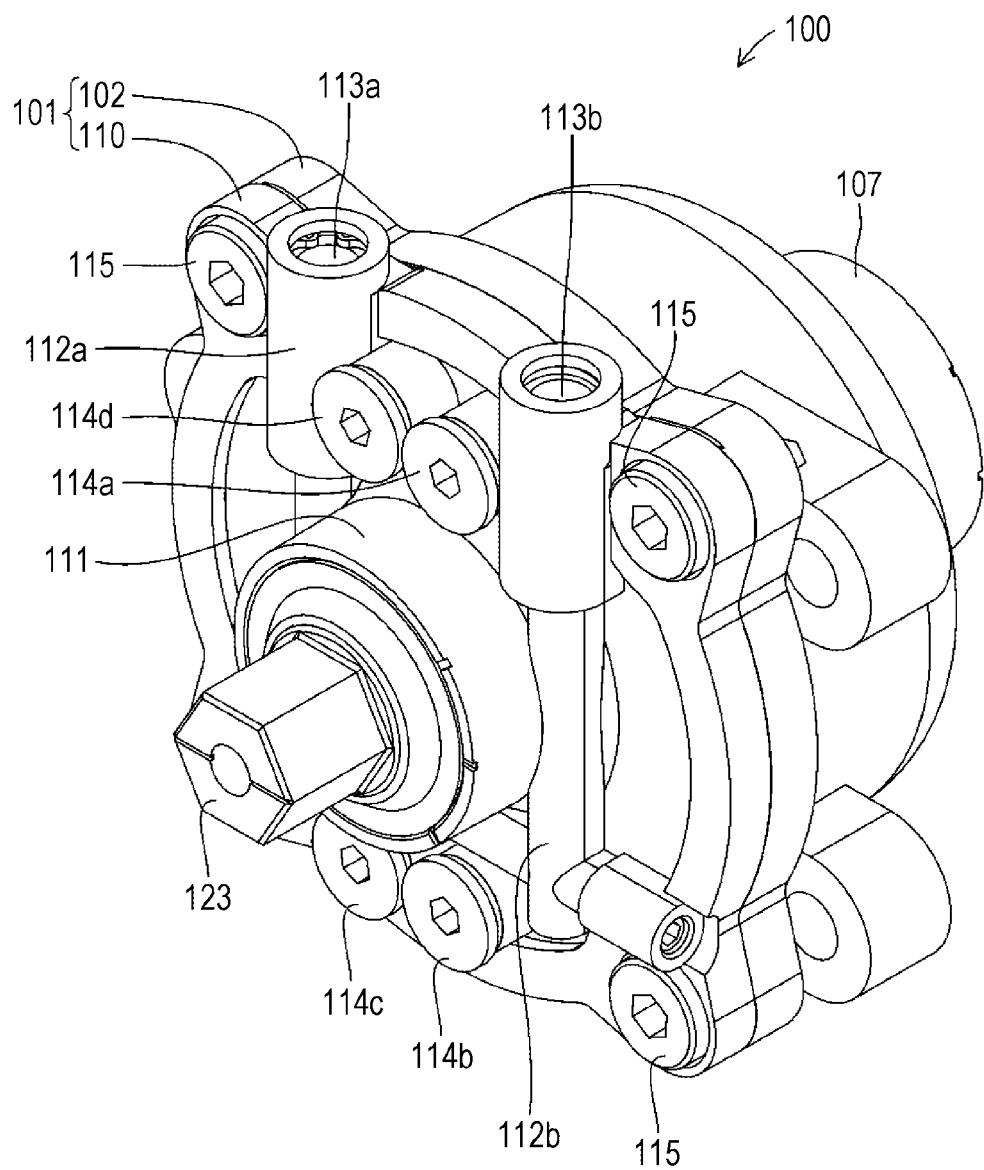
FIG. 1 is a perspective view schematically showing an entire configuration of a damper device including a volume change compensation device according to the present invention.
Figure 2:
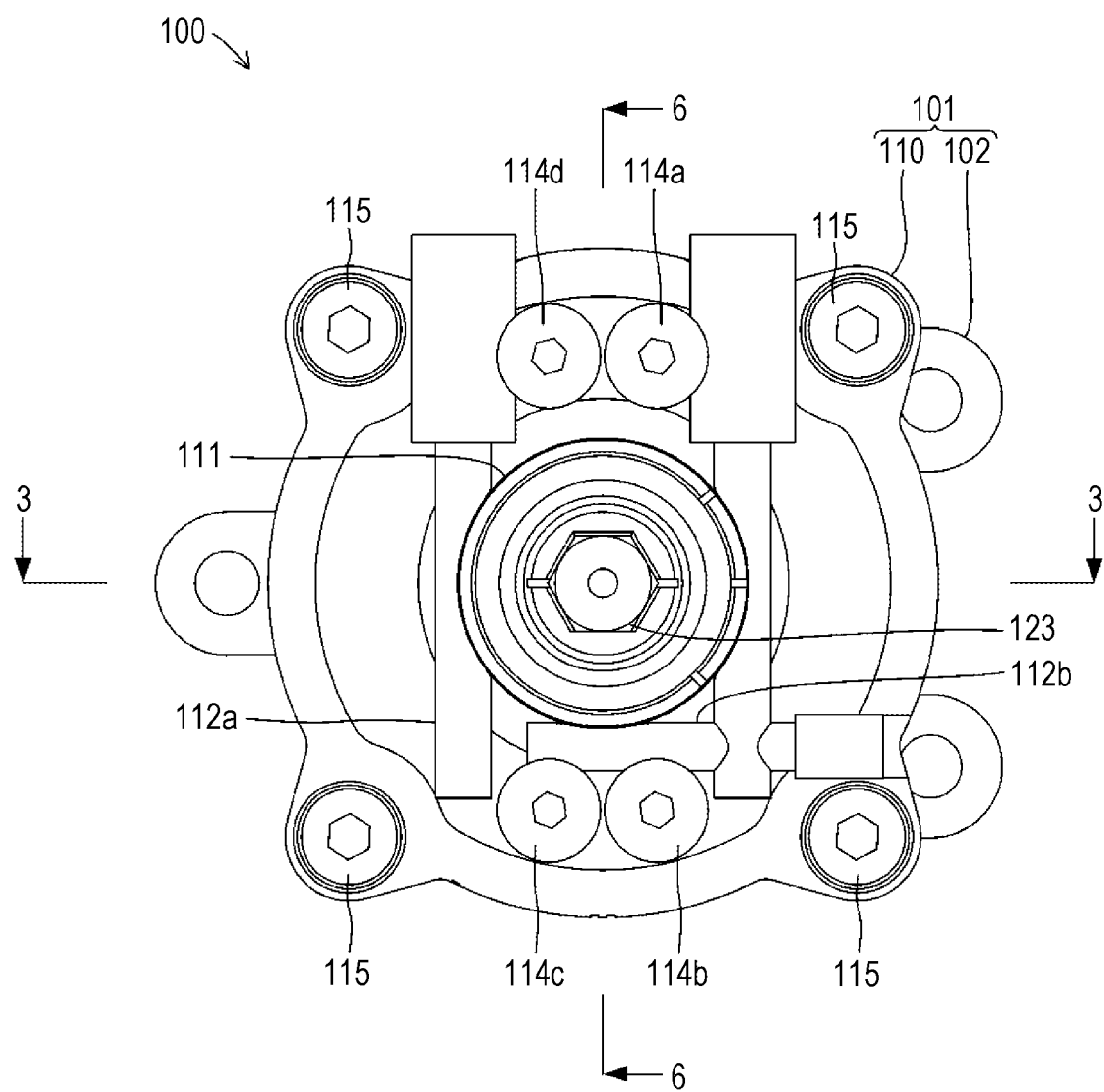
FIG. 2 is a front view showing an outline external configuration of the damper device shown in FIG. 1.
Figure 3:
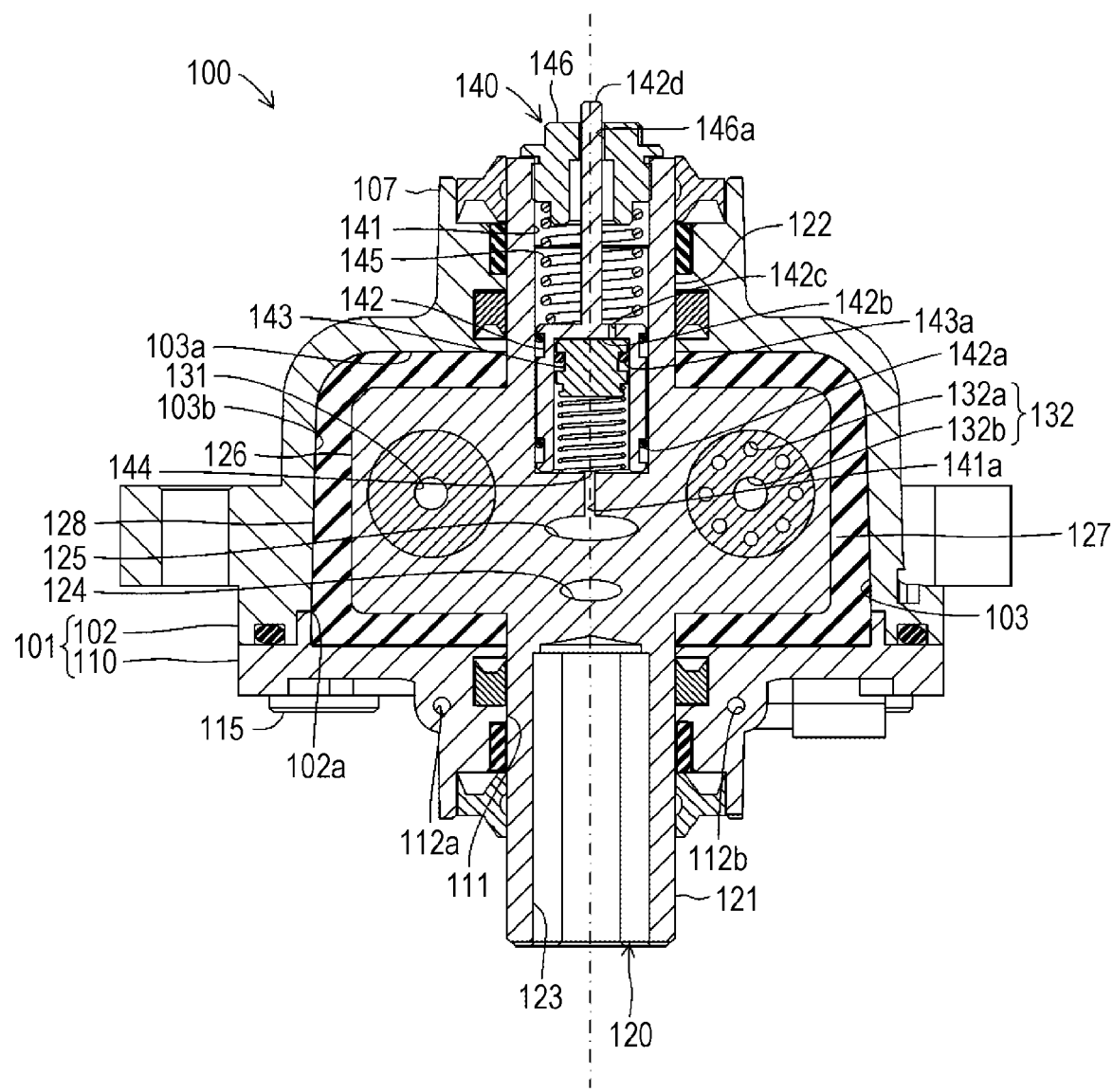
FIG. 3 is a longitudinal sectional view schematically showing the structure of the damper device from a 3-3 line shown in FIG. 2.
Figure 4:
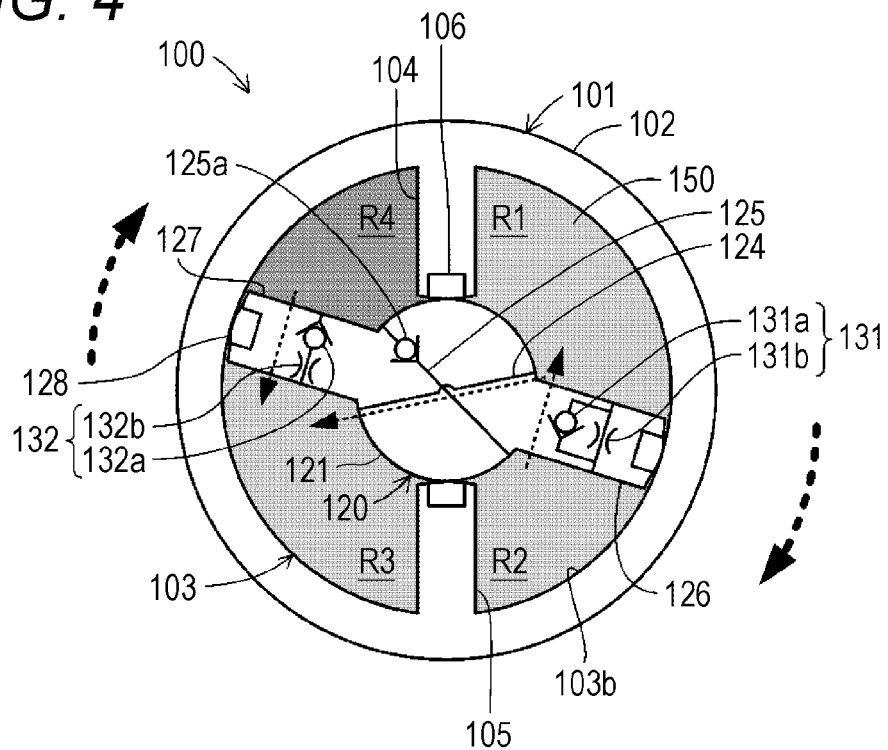
FIG. 4 is a view schematically showing the structure of the cross section of the damper device for describing an actuation state in which a rotor of the damper device shown in FIG. 1 has turned clockwise.
Figure 5:
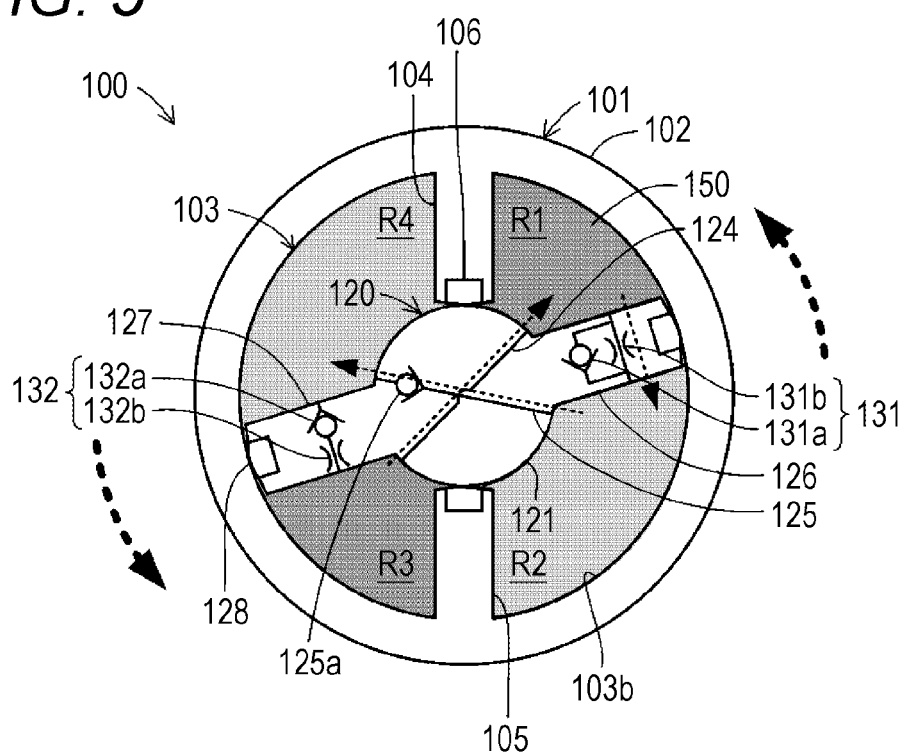
FIG. 5 is a view for describing a state in which the rotor has turned counterclockwise from the state shown in FIG. 4.

Hereinafter, one embodiment of a volume change compensation device according to the present invention and a damper device including the volume change compensation device will be described with reference to the drawings. FIG. 1 is a perspective view schematically showing an entire configuration of a damper device 100 including a volume change compensation device 140. Moreover, FIG. 2 is a front view showing an outline external configuration of the damper device 100 shown in FIG. 1. Further, FIG. 3 is a longitudinal sectional view schematically showing the structure of the damper device 100 from a 3-3 line shown in FIG. 2. In addition, FIG. 4 is a view schematically showing the structure of the cross section of the damper device 100 for describing an actuation state in which a rotor 120 of the damper device 100 shown in FIG. 1 has turned clockwise. Moreover, FIG. 5 is a view for describing a state in which the rotor 120 has turned counterclockwise from the state shown in FIG. 4.

Note that each figure to be referred in the present specification is schematically shown for the sake of easy understanding of the present invention and includes some exaggeratedly-shown components, for example. For this reason, the dimensions, ratios and the like of the components vary in some cases. The damper device 100 is a damping device attached to a base end portion of a swing arm configured to support a rear wheel of a two-wheeled self-propelled vehicle (a motorcycle) such that the rear wheel is vertically movable and configured to damp kinetic energy upon vertical movement of the rear wheel.

(Configuration of Damper Device 100)

The damper device 100 includes a housing 101. The housing 101 is a component rotatably holding the rotor 120 and forming an enclosure of the damper device 100. The damper device 100 is made of an aluminum material, an iron material, a zinc material, or various resin materials such as polyamide resin. Specifically, the housing 101 mainly includes a housing body 102 and a lid 110.

The housing body 102 is a component housing movable vanes 126, 127 of the later-described rotor 120 and hydraulic fluid 150 and rotatably supporting one end portion of a shaft 121 of the rotor 120. The housing body 102 is formed in a bottomed cylindrical shape opening larger at one end of a tubular body and opening smaller at the other end. More specifically, a cylindrical hydraulic fluid housing portion 103 and a cylindrical rotor support portion 107 are formed in the housing body 102. The hydraulic fluid housing portion 103 is formed on an opening 102a side of the tubular body opening larger at one end. The rotor support portion 107 is formed in an open state at a bottom portion 103a of the hydraulic fluid housing portion 103.

As shown in each of FIGS. 4 and 5, the hydraulic fluid housing portion 103 is a space liquid-tightly housing the movable vanes 126, 127 of the rotor 120 and the hydraulic fluid 150. The hydraulic fluid housing portion 103 includes two semi-cylindrical spaces facing each other with respect to the rotor 120 arranged at a center portion in the housing body 102. In the hydraulic fluid housing portion 103, each of fixed vanes 104, 105 is formed integrally with the housing body 102.

The fixed vanes 104, 105 are wall-shaped portions dividing, together with the rotor 120, the inside of the hydraulic fluid housing portion 103 into cells R1 to R4. The fixed vanes 104, 105 are formed to inwardly project in a raised shape from a housing portion wall surface 103b along an axis direction of the housing body 102. In this case, these two fixed vanes 104, 105 are provided at positions facing each other in a circumferential direction on an inner peripheral surface of the housing portion wall surface 103b. Of each of these fixed vanes 104, 105, a tip end portion facing the lid 110 and the shaft 121 of the rotor 120 as described later is formed in a recessed groove shape. A seal body 106 is fitted in each of these grooves.

The seal body 106 is a component for ensuring the liquid tightness of the cells R1 to R4 formed in the hydraulic fluid housing portion 103. The seal body 106 is formed in such a manner that an elastic material such as various rubber materials including nitrile rubber, hydrogenated nitrile rubber, and fluorine-containing rubber is formed in an L-shape as viewed laterally. The seal body 106 is attached to project from each of the tip end portions of the fixed vanes 104, 105 to closely contact each of an inner surface of the lid 110 and an outer peripheral surface of the shaft 121 of the rotor 120 in a slidable state.

The rotor support portion 107 is a cylindrical portion rotatably supporting one end portion of the shaft 121 of the rotor 120. The rotor support portion 107 liquid-tightly supports a support shaft portion 122 of the rotor 120 through a seal member such as a bearing or a packing.

The lid 110 is a component for liquid-tightly closing the hydraulic fluid housing portion 103 formed in the housing body 102. The lid 110 is formed in such a shape that one end portion of a rotor support portion 111 formed in a cylindrical shape projects in a flange shape. The rotor support portion 111 is a cylindrical portion rotatably supporting the other end portion of the shaft 121 of the rotor 120. The rotor support portion 111 liquid-tightly supports an outer peripheral portion of a connection portion 123 of the rotor 120 through a seal member such as a bearing or a packing.

The lid 110 is provided with each of bypass paths 112a, 112b, adjustment needles 113a, 113b, and air vent holes 114a to 114d. The bypass path 112a is a path allowing the cell R1 and the cell R2 in the hydraulic fluid housing portion 103 to communicate each other such that the hydraulic fluid 150 flows therebetween and allowing each of the cell R1 and the cell R2 to communicate with the outside. The bypass path 112b is a path allowing the cell R2 and the cell R4 in the hydraulic fluid housing portion 103 to communicate with each other such that the hydraulic fluid 150 flows therebetween and allowing each of the cell R2 and the cell R4 to communicate with the outside.

The adjustment needles 113a, 113b are components for sealing the bypass paths 112a, 112b from the outside and adjusting the flow rate of the flowing hydraulic fluid 150.

The adjustment needles 113a, 113b are turned by a tool (not shown) such as a screwdriver so that the flow amount of the hydraulic fluid 150 can be increased/decreased.

The air vent holes 114a to 114d are through-holes each separately communicating with the cells R1 to R4 and used when air is released from the cells R1 to R4. Each of these air vent holes 114a to 114d is detachably closed by a plug. The lid 110 is, with four bolts 115, attached to an end portion of the housing body 102 on a side on which the hydraulic fluid housing portion 103 opens.

The rotor 120 is a component arranged in the hydraulic fluid housing portion 103 of the housing 101 to divide the inside of the hydraulic fluid housing portion 103 into the cell R1, the cell R2, the cell R3, and the cell R4 as four spaces and turned in the hydraulic fluid housing portion 103 to increase/decrease the capacity of each of the cell R1, the cell R2, the cell R3, and the cell R4. The rotor 120 mainly includes the shaft 121 and the movable vanes 126, 127.

The shaft 121 is a round bar-shaped portion supporting the movable vanes 126, 127. The shaft 121 is made of an aluminum material, an iron material, a zinc material, or various resin materials such as polyamide resin. The shaft 121 is formed such that both end portions thereof are in a tubular shape. The support shaft portion 122 is formed at an outer peripheral portion of one (on the upper side in FIG. 3) of these end portions, and a later-described body tube 141 is formed at an inner peripheral portion. Moreover, the connection portion 123 is formed at the other (the lower side in FIG. 3) end portion of the shaft 121.

The support shaft portion 122 is a portion including a cylindrical surface slidably supported by the rotor support portion 107. The body tube 141 forms part of the later-described volume change compensation device 140. The connection portion 123 is a portion connected to one of two components attached to the damper device 100. In the present embodiment, the connection portion 123 is formed as a bottomed tubular hole having a hexagonal sectional shape.

As shown in each of FIGS. 4 and 5, each of a first bidirectional communication path 124 and a first unidirectional communication path 125 is formed at the shaft 121. The first bidirectional communication path 124 is a path allowing the bidirectional flow of the hydraulic fluid 150 between two cells of which capacities are simultaneously decreased by turning of the movable vanes 126, 127 in one direction and are simultaneously increased by turning of the movable vanes 126, 127 in the other direction. In the present embodiment, the first bidirectional communication path 124 is formed to penetrate the shaft 121 such that the cells R1, R3 of which capacities are simultaneously decreased by counterclockwise turning of the movable vanes 126, 127 as viewed in the figure and are simultaneously increased by clockwise turning of the movable vanes 126, 127 as viewed in the figure communicate with each other.

The first unidirectional communication path 125 is a path allowing the hydraulic fluid 150 to flow only from one side to the other side between two cells of which capacities are simultaneously increased by turning of the movable vanes 126, 127 in one direction and are simultaneously decreased by turning of the movable vanes 126, 127 in the other direction. In the present embodiment, the first unidirectional communication path 125 is formed to penetrate the shaft 121 through a one-way valve 125a such that the hydraulic fluid 150 flows only from the cell R2 to the cell R4 between the cells R2, R4 of which capacities are simultaneously increased by counterclockwise turning of the movable vanes 126, 127 as viewed in the figure and are simultaneously decreased by clockwise turning of the movable vanes 126, 127 as viewed in the figure. Moreover, the first unidirectional communication path 125 also communicates with the volume change compensation device 140 on the upstream side of the one-way valve 125a in a flow direction of the hydraulic fluid 150.

The one-way valve 125a is a valve allowing the hydraulic fluid 150 to flow from a cell R2 side to a cell R4 side in the first unidirectional communication path 125 allowing communication between the cell R2 and the cell R4 and preventing the hydraulic fluid 150 from flowing from the cell R4 side to the cell R2 side.

The movable vanes 126, 127 are components for liquid-tightly increasing/decreasing the capacity of each of these spaces while dividing the inside of the hydraulic fluid housing portion 103 into the multiple spaces. Each of the movable vanes 126, 127 includes a plate-shaped body extending in a radial direction of the shaft 121 (the hydraulic fluid housing portion 103). In this case, these two movable vanes 126, 127 are formed to extend in opposite directions (in other words, in the same virtual plane) with respect to the shaft 121. Of each of the movable vanes 126, 127, a C-shaped (or backwards C-shaped) tip end portion facing each of the bottom portion 103a, the housing portion wall surface 103b, and the inner surface of the lid 110 is formed in a recessed groove shape. A seal body 128 is fitted in each of these grooves.

The seal body 128 is a component for ensuring the liquid tightness of the cells R1 to R4 formed in the hydraulic fluid housing portion 103 as in the seal body 106. The seal body 128 is formed in such a manner that an elastic material such as various rubber materials including nitrile rubber, hydrogenated nitrile rubber, and fluorine-containing rubber is formed in a C-shape (or a backwards C-shape) as viewed laterally. The seal body 128 is attached to project from each of the tip end portions of the movable vanes 126, 127 to closely contact each of the bottom portion 103a, the housing portion wall surface 103b, and the inner surface of the lid 110 in a slidable state.

With this configuration, the movable vanes 126, 127 cooperate with the fixed vanes 104, 105 to liquid-tightly form the cell R1, the cell R2, the cell R3, and the cell R4 as the four spaces in the hydraulic fluid housing portion 103. More specifically, in the hydraulic fluid housing portion 103, the fixed vane 104 and the movable vane 126 form the cell R1, the movable vane 126 and the fixed vane 105 form the cell R2, the fixed vane 105 and the movable vane 127 form the cell R3, and the movable vane 127 and the fixed vane 104 form the cell R4. That is, the cell R1, the cell R2, the cell R3, and the cell R4 are sequentially formed adjacent to each other along the circumferential direction in the hydraulic fluid housing portion 103.

A second bidirectional communication path 131 and a second unidirectional communication path 132 are each formed at the movable vanes 126, 127. The second bidirectional communication path 131 is formed at the movable vane 126 dividing the cell R1 and the cell R2 from each other such that the cell R1 of the cells R1, R3 as two communication cells communicating with each other through the first bidirectional communication path 124 and the cell R2 of the cells R2, R4 as two one-way communication cells communicating with each other through the first unidirectional communication path 125.

The second bidirectional communication path 131 is formed such that the hydraulic fluid 150 flows from the cell R2 side as the one-way communication cell to a cell R1 side as the communication cell and flows from the cell R1 side to the cell R2 side in a limited manner. Specifically, the second bidirectional communication path 131 is formed such that a one-way valve 131a and a throttle valve 131b are arranged in parallel.

The one-way valve 131a is formed as a valve configured to allow the hydraulic fluid 150 to flow from the cell R2 side to the cell R1 side and prevent the hydraulic fluid 150 from flowing from the cell R1 side to the cell R2 side. Moreover, the throttle valve 131b is formed as a valve capable of achieving a bidirectional flow between the cell R1 and the cell R2 while limiting such a flow of the hydraulic fluid 150. In this case, the phrase of limiting the flow of the hydraulic fluid 150 in the throttle valve 131b means that under the same conditions (e.g., a pressure and a hydraulic fluid viscosity), the hydraulic fluid 150 is less likely to flow as compared to the flowability of the hydraulic fluid 150 in the one-way valve 131a.

The second unidirectional communication path 132 is formed at the movable vane 127 dividing the cell R3 and the cell R4 from each other such that the hydraulic fluid 150 flows in a limited manner only from the cell R4 side as the one-way communication cell to a cell R3 side as the communication cell between the cell R3 as the communication cell not communicating with the second bidirectional communication path 131 and the cell R4 as the one-way communication cell not communicating with the second bidirectional communication path 131. Specifically, the second unidirectional communication path 132 is formed such that a one-way valve 132a allowing the hydraulic fluid 150 to flow only from the cell R4 side to the cell R3 side and a throttle valve 132b limiting the flow amount of the hydraulic fluid 150 are arranged in series. In this case, the phrase of limiting the flow of the hydraulic fluid 150 in the throttle valve 132b means that under the same conditions (e.g., a pressure and a hydraulic fluid viscosity), the hydraulic fluid 150 is less likely to flow as compared to the flowability of the hydraulic fluid 150 in the one-way valve 132a.

In the damper device 100, the flow of the hydraulic fluid 150 among the cell R1 to the cell R4 is limited by the first bidirectional communication path 124, the first unidirectional communication path 125, the second bidirectional communication path 131, and the second unidirectional communication path 132, and damping force is generated accordingly upon turning of the rotor 120. That is, the damper device 100 according to the present embodiment includes a rotary damper configured to generate the damping force upon rotary motion.

The volume change compensation device 140 is equipment for compensating for a change in the volume of the hydraulic fluid 150 in the hydraulic fluid housing portion 103 due to expansion or contraction caused by a temperature change. The volume change compensation device 140 is provided to communicate with the first unidirectional communication path 125 in the shaft 121 of the rotor 120. The volume change compensation device 140 includes the body tube 141.

The body tube 141 is a portion slidably housing an inner cylinder piston 142 and housing part of the hydraulic fluid 150 in the hydraulic fluid housing portion 103. The body tube 141 is formed in a cylindrical shape. In this case, the capacity of the body tube 141 is set to such a size (an inner diameter and a length in the axis direction) that the expected volume increment of the hydraulic fluid 150 housed in the hydraulic fluid housing portion 103 and the inner cylinder piston 142 sliding in the body tube 141 can be housed.

A connection path 141a is formed at one (the lower side in FIG. 3) end portion of the body tube 141. The connection path 141a communicates with the hydraulic fluid housing portion 103, and allows the hydraulic fluid 150 to flow between the connection path 141a and the hydraulic fluid housing portion 103. The connection path 141a is formed to extend linearly such that one (the lower side in FIG. 3) end portion of the body tube 141 opens smaller than the inner diameter of the body tube 141 and communicates with the first unidirectional communication path 125 formed in the shaft 121. In this case, the connection path 141a may be formed to have an inner diameter of equal to or greater than the inner diameter of the first unidirectional communication path 125. Note that the connection path 141a is formed to have an inner diameter of smaller than the inner diameter of the first unidirectional communication path 125 so that outflow of the hydraulic fluid 150 from a body tube 141 side can be reduced.

In the body tube 141, each of the inner cylinder piston 142, an inner cylinder piston pressing elastic body 145, and a plug 146 is provided. The inner cylinder piston 142 is a portion slidably housing an inner cylinder inner small piston 143 and housing the hydraulic fluid 150 supplied into the hydraulic fluid housing portion 103 in the body tube 141. The inner cylinder piston 142 is formed in such a manner that an aluminum material, an iron material, a zinc material, or various resin materials such as polyamide resin is formed in a bottomed cylindrical shape. In this case, the inner cylinder piston 142 is arranged in the body tube 141 in such an orientation that the inner cylinder piston 142 opens to a connection path 141a side.

An outer peripheral surface of the inner cylinder piston 142 is formed to have such an outer diameter that the inner cylinder piston 142 is slidable in the body tube 141. Further, two annular grooves are formed at the outer peripheral surface of the inner cylinder piston 142. In each of these grooves, an O-ring 142a for liquid-tightly housing the hydraulic fluid 150 guided into the body tube 141 is fitted. Each of an air hole 142c and an extending body 142d is formed at a bottom portion 142b of the inner cylinder piston 142. The air hole 142c is a through-hole for an air flow into the inner cylinder piston 142 for reliably sliding the inner cylinder inner small piston 143 housed in the inner cylinder piston 142.

The extending body 142d is a component indicating the position of the inner cylinder piston 142 in the body tube 141, i.e., the status of the volume of the hydraulic fluid 150 in the hydraulic fluid housing portion 103. Specifically, the extending body 142d is formed in a round bar shape having such a length that the extending body 142d is exposed after having extended in the axis direction from a center portion of the bottom portion 142b of the inner cylinder piston 142 and having protruded from the upper end portion of the body tube 141 as viewed in the figure.

The inner capacity of the inner cylinder piston 142 is set to such a size (an inner diameter and a length in the axis direction) that the hydraulic fluid 150 necessary for compensating for the expected volume decrement of the hydraulic fluid 150 housed in the hydraulic fluid housing portion 103 and the inner cylinder inner small piston 143 sliding in the inner cylinder piston 142 can be housed. In the inner cylinder piston 142, each of the inner cylinder inner small piston 143 and a small piston pressing elastic body 144 is provided.

The inner cylinder inner small piston 143 is a component for housing the hydraulic fluid 150 in the inner cylinder piston 142 while the hydraulic fluid 150 is flowing out of the connection path 141a or flowing in the connection path 141a. The inner cylinder inner small piston 143 is formed in such a manner that an aluminum material, an iron material, a zinc material, or various resin materials such as polyamide resin is formed in a circular columnar shape. An outer peripheral surface of the inner cylinder inner small piston 143 is formed to have such an outer diameter that the inner cylinder inner small piston 143 is slidable in the inner cylinder piston 142. Further, an annular groove is formed at the outer peripheral surface of the inner cylinder inner small piston 143. In this groove, an O-ring 143a for liquid-tightly housing the hydraulic fluid 150 guided into the inner cylinder piston 142 is fitted.

The small piston pressing elastic body 144 is a component for constantly elastically pressing the inner cylinder inner small piston 143 to a bottom portion 142b side in the inner cylinder piston 142. The small piston pressing elastic body 144 includes a coil spring. Of the small piston pressing elastic body 144, one (the lower side in FIG. 3) end portion presses the periphery of the connection path 141a at one (the lower side in FIG. 3) end portion of the body tube 141, and the other (the upper side in FIG. 3) end portion presses the inner cylinder inner small piston 143.

The inner cylinder piston pressing elastic body 145 is a component for constantly elastically pressing the inner cylinder piston 142 to the connection path 141a side in the body tube 141. The inner cylinder piston pressing elastic body 145 includes a coil spring. Of the inner cylinder piston pressing elastic body 145, one (the lower side in FIG. 3) end portion presses the bottom portion 142b of the inner cylinder piston 142, and the other (the upper side in FIG. 3) end portion presses the plug 146.

Elastic force of the inner cylinder piston pressing elastic body 145 is set to such a strength that the inner cylinder piston 142 can be pressed against the end portion of the body tube 141 on the connection path 141a side in a state in which the inner pressure of the hydraulic fluid housing portion 103 in expected main temperature environment upon use of the damper device 100 acts on the inner cylinder piston 142. The main temperature environment as described herein is a temperature that the time of exposure of the damper device 100 is longest in a temperature range in use environment where the damper device 100 is placed or the median of the temperature range in the use environment. In the present embodiment, the main temperature environment is set to 25° C.

The plug 146 is a component for receiving the elastic force of the inner cylinder piston pressing elastic body 145 in the body tube 141. The plug 146 is formed in such a manner that a metal material or a resin material is formed in a cylindrical shape. An internal thread is formed at an outer peripheral portion of the plug 146, and the plug 146 is screwed into the other (the upper side in FIG. 3) end portion of the body tube 141 on the side opposite to the side on which the connection path 141a is provided. The extending body 142d extending from the inner cylinder piston 142 slidably penetrates a through-hole 146a formed at a center portion of the plug 146.

In this case, a clearance is formed between the through-hole 146a formed at the center portion of the plug 146 and the extending body 142d, and an inner space between the plug 146 and the inner cylinder piston 142 in the body tube 141 is under the same air pressure (e.g., an atmospheric pressure) as that outside the inner cylinder piston 142. With this configuration, air moves out of the inner cylinder piston 142 or moves in the inner cylinder piston 142 through the air hole 142c, and therefore, the inner cylinder inner small piston 143 is easily displaceable in the axis direction in the inner cylinder piston 142.

The hydraulic fluid 150 is a substance for providing resistance to the movable vanes 126, 127 turning in the hydraulic fluid housing portion 103 such that the damper function of the damper device 100 works. The hydraulic fluid housing portion 103 is filled with the hydraulic fluid 150. The hydraulic fluid 150 includes a liquid, gel, or semi-solid substance having viscosity according to the specifications of the damper device 100 and having fluidity. In this case, the viscosity of the hydraulic fluid 150 is selected as necessary according to the specifications of the damper device 100. In the present embodiment, the hydraulic fluid 150 includes oil such as mineral oil or silicone oil.

(Charging of Volume Change Compensation Device 140 with Hydraulic Fluid 150)

Next, the process of charging the volume change compensation device 140 configured as described above with the hydraulic fluid 150 will be described. First, a worker prepares each of the damper device 100 not assembled with the volume change compensation device 140 and each component forming the volume change compensation device 140. The worker assembles each of these components with the damper device 100, thereby assembling the volume change compensation device 140 with the damper device 100.

Specifically, the worker attaches the O-ring 143a to the outer peripheral surface of the inner cylinder inner small piston 143. Further, the worker attaches the O-rings 142a to the outer peripheral surface of the inner cylinder piston 142. Next, the worker inserts the inner cylinder inner small piston 143 and the small piston pressing elastic body 144 into the inner cylinder piston 142. Next, the worker inserts the inner cylinder piston 142 assembled with the O-rings 142a, the inner cylinder inner small piston 143, and the small piston pressing elastic body 144 into the body tube 141 formed at one (the upper side in FIG. 3) end portion side of the shaft 121 forming the rotor 120.

Next, the worker inserts the inner cylinder piston pressing elastic body 145 into the body tube 141 into which the inner cylinder piston 142 has been inserted. Thereafter, the worker attaches the plug 146 to the other (the upper side in FIG. 3) end portion of the body tube 141. In this manner, the worker can assemble the volume change compensation device 140 with the damper device 100. In this case, in the volume change compensation device 140, the inner cylinder piston 142 is elastically pressed against the end portion of the body tube 141 on the connection path 141a side by the inner cylinder piston pressing elastic body 145. Further, the inner cylinder inner small piston 143 is elastically pressed against the bottom portion 142b of the inner cylinder piston 142 by the small piston pressing elastic body 144.

Figure 6:
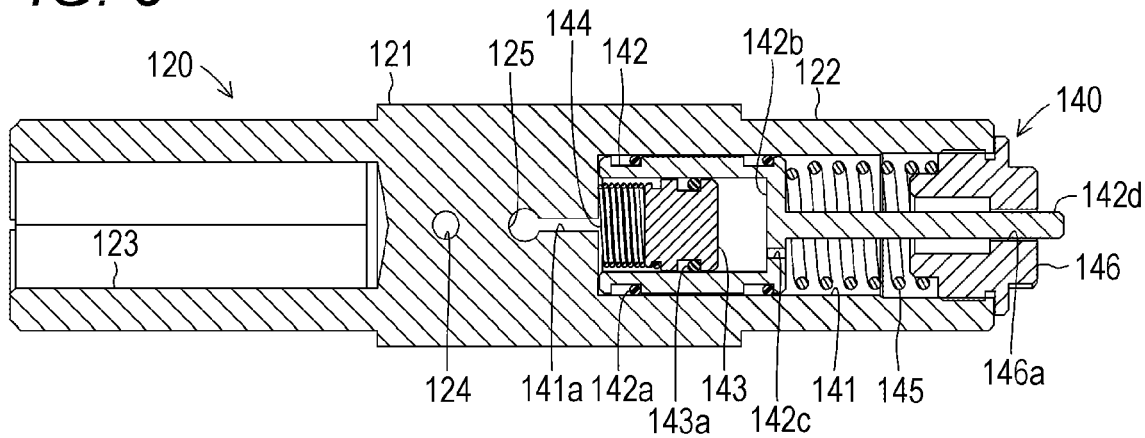
FIG. 6 is a sectional view schematically showing the structures of the longitudinal sections of the rotor and the volume change compensation device from a 6-6 line shown in FIG. 2 for describing an actuation state of the volume change compensation device according to the present invention in a state in which a small piston pressing elastic body has contracted.

Next, the worker charges the volume change compensation device 140 with the hydraulic fluid 150. Specifically, the worker sucks, as shown in FIG. 6, air from the hydraulic fluid housing portion 103 through at least one of the air vent holes 114a to 114d of the damper device 100 by a vacuum pumping process using a not-shown vacuum pump, and in this manner, obtains a vacuum state. Accordingly, in the volume change compensation device 140, the inner cylinder inner small piston 143 closely contacts the end portion of the body tube 141 on the connection path 141a side through the small piston pressing elastic body 144 against elastic force of the small piston pressing elastic body 144. That is, the capacity of the inner cylinder piston 142 becomes minimum.

Figure 7:
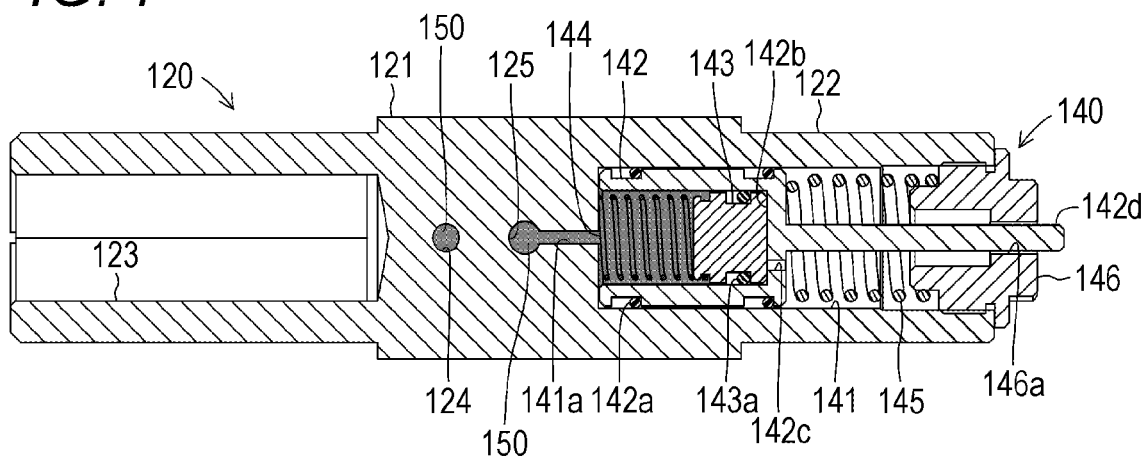
FIG. 7 is a sectional view schematically showing a state in which an inner cylinder piston has been charged with hydraulic fluid from the state shown in FIG. 6.

Next, the worker supplies, as shown in FIG. 7, the hydraulic fluid 150 into the hydraulic fluid housing portion 103 through at least one of the bypass paths 112a, 112b by means of a not-shown hydraulic fluid supply pump. In this case, the body tube 141 of the volume change compensation device 140 communicates with the hydraulic fluid housing portion 103 through the connection path 141*a*. Thus, the worker can charge each of the cell R1 to the cell R4, the first bidirectional communication path 124, the first unidirectional communication path 125, the second bidirectional communication path 131, the second unidirectional communication path 132, and the inner cylinder piston 142 with the hydraulic fluid 150.

In this case, the worker charges the hydraulic fluid 150 until the inner cylinder inner small piston 143 in the inner cylinder piston 142 closely contacts the bottom portion 142*b*. That is, the worker changes the hydraulic fluid 150 to the maximum capacity reaching a capacity limit in the inner cylinder piston 142. In this case, the worker restricts displacement such that the extending body 142*d* protruding from the body tube 141 does not displace. With this configuration, unexpected displacement of the inner cylinder piston 142 can be prevented.

The worker checks and grasps, in advance, the capacity of the hydraulic fluid 150 of the entirety of the damper device 100 including the capacity of the inner cylinder piston 142, and the grasped amount of hydraulic fluid 150 is charged so that the hydraulic fluid 150 can be charged to the maximum capacity in the inner cylinder piston 142. With this configuration, the worker can charge the hydraulic fluid housing portion 103 and the inner cylinder piston 142 in the volume change compensation device 140 with the hydraulic fluid 150. Note that the process of charging the damper device 100 with the hydraulic fluid 150 may be performed in a room or a device under the same temperature environment as the expected main temperature environment for the damper device 100.

The damper device 100 configured as described above is provided between two components movably coupled to each other. For example, in the damper device 100, a side close to a frame as a basic framework of the two-wheeled self-propelled vehicle (not shown) is a fixed side, and the housing 101 is attached to this side. A base end portion side of the swing arm configured to support the rear wheel of the two-wheeled self-propelled vehicle such that the rear wheel is vertically movable is a movable side, and the rotor 120 is attached to this side. Note that in FIG. 7 and FIGS. 8 to 10 described later, the hydraulic fluid 150 is indicated by dense hatching.

(Actuation of Damper Device 100)

Next, actuation of the damper device 100 configured as described above will be described. The damper device 100 generates the damping force for the swing arm when the swing arm vertically moves upon traveling of the self-propelled vehicle.

Specifically, in the damper device 100, the rotor 120 turns clockwise as viewed in the figure as shown in FIG. 4 in a case where the rear wheel of the self-propelled vehicle has moved over, e.g., a step and has been lifted from a state in which the swing arm is lowered. That is, in the damper device 100, the movable vane 126 turns toward the fixed vane 105, and the movable vane 127 turns toward the fixed vane 104.

In this case, in the damper device 100, only the cell R4 is brought into a high-pressure state in which outflow of the hydraulic fluid 150 is limited by action of the first bidirectional communication path 124, the first unidirectional communication path 125, the second bidirectional communication path 131, and the second unidirectional communication path 132. Thus, the rotor 120 turns clockwise as viewed in the figure while generating damping force smaller than that upon counterclockwise turning as viewed in the figure as described later.

On the other hand, in the damper device 100, the rotor 120 turns counterclockwise as viewed in the figure as shown in FIG. 5 in a case where the rear wheel of the self-propelled vehicle has moved over the step and the swing arm has been lowered from the lifted state. That is, in the damper device 100, the movable vane 126 turns toward the fixed vane 104, and the movable vane 127 turns toward the fixed vane 105.

In this case, in the damper device 100, each of the cell R1 and the cell R3 is brought into a high-pressure state in which outflow of the hydraulic fluid 150 is limited by action of the first bidirectional communication path 124, the first unidirectional communication path 125, the second bidirectional communication path 131, and the second unidirectional communication path 132. Thus, the rotor 120 turns counterclockwise as viewed in the figure while generating damping force greater than that upon clockwise turning as viewed in the figure as described above. That is, the volume change compensation device 140 communicates with the cell R2 maintained in a low-pressure state without being brought into a high-pressure state upon both of clockwise turning and counterclockwise turning of the rotor 120 as viewed in the figure.

Note that in FIGS. 4 and 5, a turning direction of the rotor 120 is indicated by thick dashed arrows and the flow direction of the hydraulic fluid 150 in each of the first bidirectional communication path 124, the first unidirectional communication path 125, the second bidirectional communication path 131, and the second unidirectional communication path 132 is indicated by a thin dashed arrow. Moreover, in FIGS. 4 and 5, a state in which the pressure of the hydraulic fluid 150 is relatively higher than those in other cells is indicated by dense hatching and a state in which the pressure is relatively lower is indicated by light hatching.

The volume change compensation device 140 compensates for a change in the volume of the hydraulic fluid 150 based on a temperature change regardless of turning motion of the rotor 120 as described above. Specifically, in a case where the temperature of the hydraulic fluid 150 in the damper device 100 has decreased, the volume of the entirety of the hydraulic fluid 150 decreases, and therefore, the inner pressure of the inner cylinder piston 142 decreases in the volume change compensation device 140. In this case, the inner cylinder inner small piston 143 is elastically pressed to the bottom portion 142*b* side by the small piston pressing elastic body 144 in the inner cylinder piston 142. However, pressing force of the small piston pressing elastic body 144 is sufficiently smaller than suction force acting on the inside of the inner cylinder piston 142 from the hydraulic fluid housing portion 103 due to contraction of the hydraulic fluid 150 upon a decrease in the volume of the hydraulic fluid 150.

Figure 8:
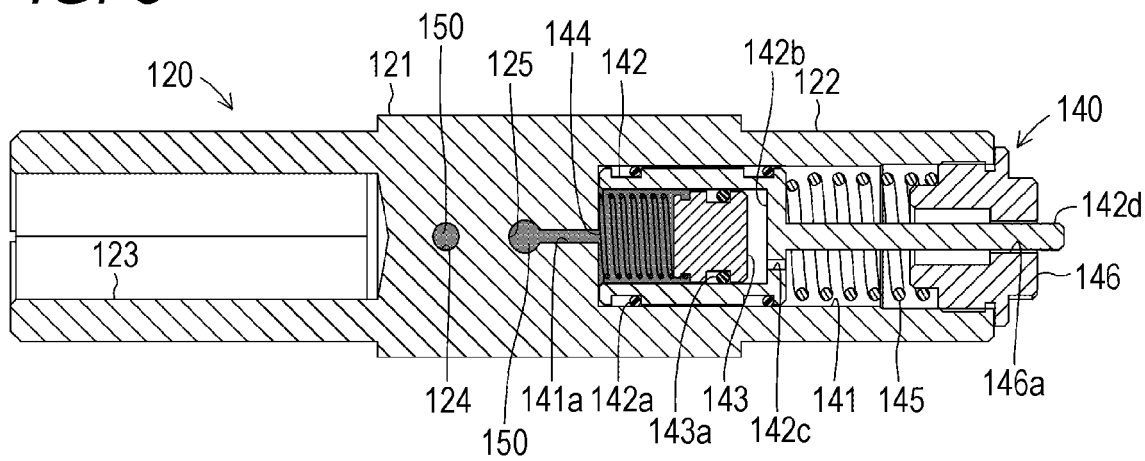
FIG. 8 is a sectional view schematically showing a state in which the volume of the hydraulic fluid has contracted due to a decrease in the temperature of the hydraulic fluid on a damper device side and the hydraulic fluid has flowed out of the inner cylinder piston to the damper device side from the state shown in FIG. 6.

Thus, in a case where the volume of the hydraulic fluid 150 in the hydraulic fluid housing portion 103 has decreased, the inner cylinder inner small piston 143 is easily displaceable to the connection path 141*a* side against the elastic force of the small piston pressing elastic body 144. Accordingly, as shown in FIG. 8 the hydraulic fluid 150 in the inner cylinder piston 142 is supplied to the cell R2 through each of the connection path 141*a* and the first unidirectional communication path 125 due to a decrease in the volume of the hydraulic fluid 150 in the hydraulic fluid housing portion 103, and in this manner, the volume change compensation device 140 compensates for the decrement of the volume of the hydraulic fluid 150 in the hydraulic fluid housing portion 103.

On the other hand, in a case where the temperature of the hydraulic fluid 150 has increased, the volume of the entirety of the hydraulic fluid 150 of the damper device 100 increases, and accordingly, the inner pressure of the inner cylinder piston 142 increases in the volume change compensation device 140. In this case, the inner cylinder inner small piston 143 displaces toward the bottom portion 142b side in the inner cylinder piston 142 in a case where the inner cylinder inner small piston 143 is still in the middle of a stroke toward the bottom portion 142b side. In a case where the inner cylinder inner small piston 143 butts the bottom portion 142b in the inner cylinder piston 142, the inner cylinder inner small piston 143 presses the entirety of the inner cylinder piston 142 to a plug 146 side.

In this case, pressing force of the inner cylinder piston pressing elastic body 145 for elastically pressing the inner cylinder piston 142 to the connection path 141a side is smaller than pressing force acting on the inside of the inner cylinder piston 142 and the inside of the body tube 141 from the hydraulic fluid housing portion 103 due to expansion of the hydraulic fluid 150 upon an increase in the volume of the hydraulic fluid 150.

Figure 9:
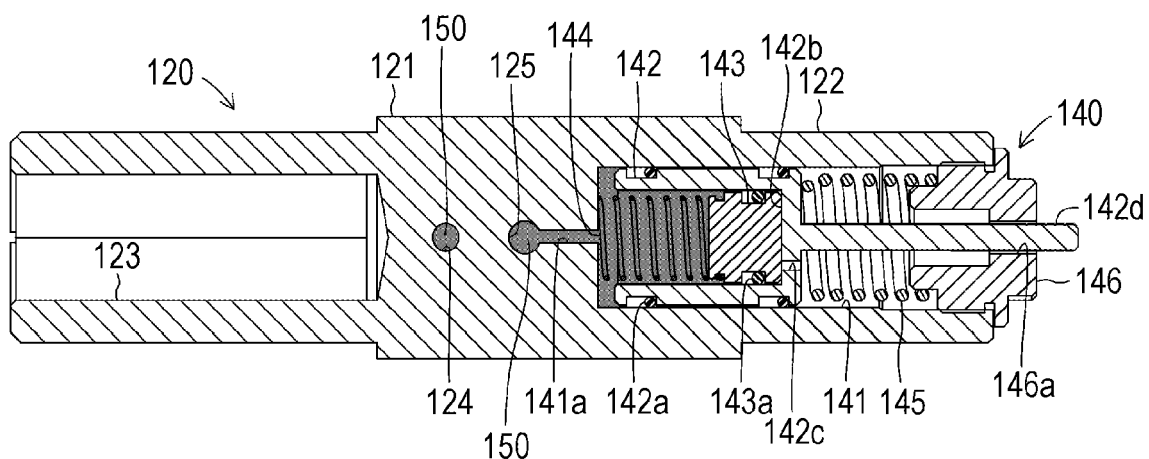
FIG. 9 is a sectional view schematically showing a state in which the volume of the hydraulic fluid has increased due to an increase in the temperature of the hydraulic fluid on the damper device side and the hydraulic fluid has further flowed into a body tube from the state shown in FIG. 7.

Thus, in a case where the volume of the hydraulic fluid 150 in the hydraulic fluid housing portion 103 has increased, the inner cylinder piston 142 is displaceable to the plug 146 side against the elastic force of the inner cylinder piston pressing elastic body 145. Accordingly, as shown in FIG. 9, the hydraulic fluid 150 in the cell R2 is supplied into the body tube 141 through each of the first unidirectional communication path 125 and the connection path 141a due to an increase in the volume of the hydraulic fluid 150 in the hydraulic fluid housing portion 103, and in this manner, the volume change compensation device 140 compensates for the increment of the volume of the hydraulic fluid 150 in the hydraulic fluid housing portion 103.

Note that in a case where the temperature of the hydraulic fluid 150 in the damper device 100 has decreased in a state in which the inner cylinder piston 142 has displaced to the plug 146 side, the hydraulic fluid 150 in the body tube 141 is first supplied to the cell R2 through each of the connection path 141a and the first unidirectional communication path 125 and the volume change compensation device 140 compensates for the decrement of the volume of the hydraulic fluid 150 in the hydraulic fluid housing portion 103 accordingly. After the inner cylinder piston 142 has butted an inner wall of the body tube 141 on the connection path 141a side, the hydraulic fluid 150 in the inner cylinder piston 142 is supplied to the cell R2 through each of the connection path 141a and the first unidirectional communication path 125, and the volume change compensation device 140 compensates for the decrement of the volume of the hydraulic fluid 150 in the hydraulic fluid housing portion 103 accordingly.

In the volume change compensation device 140, the status of the volume and temperature of the hydraulic fluid 150 in the hydraulic fluid housing portion 103 can be shown to the outside by the amount of protrusion of the extending body 142d protruding from the plug 146 in the above-described process of action in compensation for a change in the volume of the hydraulic fluid 150 in the hydraulic fluid housing portion 103.

As seen from description of the actuation method above, according to the above-described embodiment, the damper device 100 can mainly compensate for the decrement of the volume of the hydraulic fluid 150 in the hydraulic fluid housing portion 103 by the hydraulic fluid 150 housed in the inner cylinder piston 142, and can mainly compensate for the increment of the volume of the hydraulic fluid 150 in the hydraulic fluid housing portion 103 by the capacity of the body tube 141. That is, the damper device 100 according to the present invention can use only the hydraulic fluid 150 as fluid housed in the hydraulic fluid housing portion 103 to compensate for a change in the volume of the hydraulic fluid 150. Thus, in the damper device 100 according to the present invention, a manufacturing burden can be reduced with a simple configuration.

Further, implementation of the present invention is not limited to the above-described embodiment, and various changes can be made without departing from the object of the present invention. Note that in description of each variation, the same reference numerals are used to represent elements similar to those of the above-described embodiment and overlapping description thereof will be omitted.

For example, in the above-described embodiment, the body tube 141 is formed as part of the shaft 121 of the rotor 120. However, the body tube 141 may be formed separately from the shaft 121, and may be fitted in the shaft 121. The volume change compensation device 140 is not necessarily provided in the shaft 121, and may be provided integrally with or separately from the outside (e.g., the housing 101 or the lid 110) of the shaft 121.

In the above-described embodiment, in the volume change compensation device 140, the hydraulic fluid housing portion 103 is filled with the hydraulic fluid 150 in a state in which the inside of the hydraulic fluid housing portion 103 is in a vacuum state. However, in the volume change compensation device 140, the inside of the hydraulic fluid housing portion 103 is not necessarily brought into the vacuum state, and the hydraulic fluid housing portion 103 may be filled with the hydraulic fluid 150 under the atmospheric pressure. In this case, the worker operates the extending body 142d protruding from the body tube 141 to move back and forth in a state in which the hydraulic fluid housing portion 103 is filled with the hydraulic fluid 150 to repeatedly move the inner cylinder piston 142 back and forth in the body tube 141, thereby discharging air from the body tube 141 and the inner cylinder piston 142 and preventing air from remaining in the body tube 141 and the inner cylinder piston 142.

Figure 10:
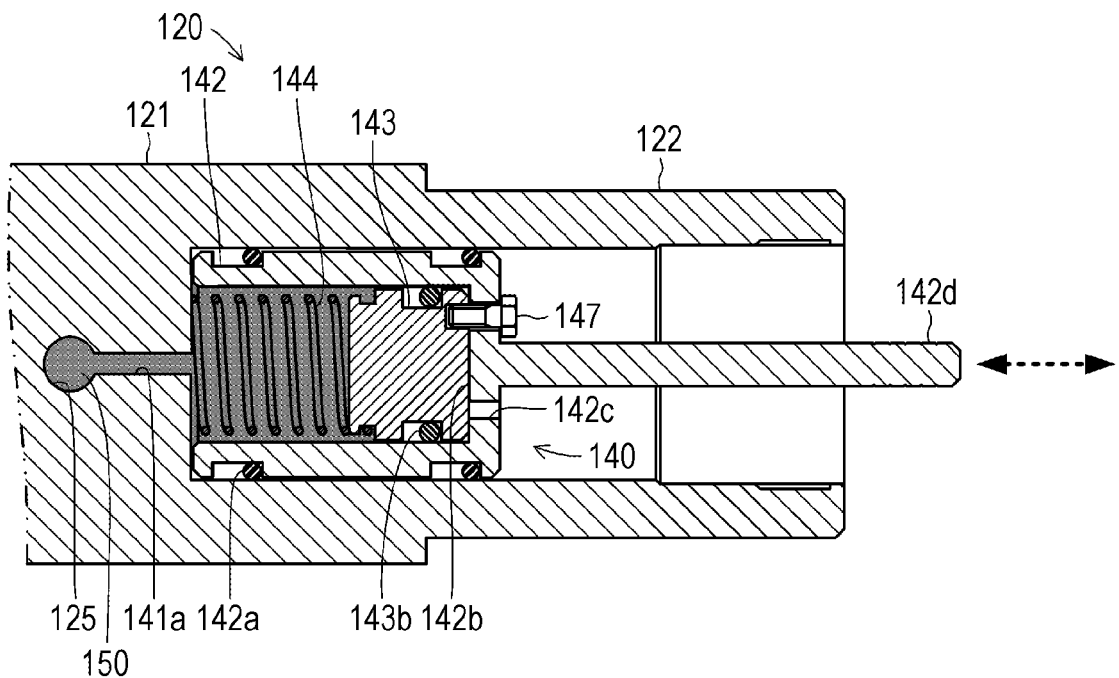
FIG. 10 is a partially-enlarged sectional view of a rotor schematically showing the structure of the longitudinal section of a volume change compensation device according to a variation of the present invention.

In this case, the volume change compensation device 140 may include a fixing tool 147 configured to fix the inner cylinder inner small piston 143 to the bottom portion 142b of the inner cylinder piston 142. As shown in FIG. 10, the fixing tool 147 may include a bolt penetrating the bottom portion 142b of the inner cylinder piston 142 and screwed into an internal thread provided at the inner cylinder piston 142. In this case, the plug 146 is detached from the body tube 141.

According to this configuration, in the volume change compensation device 140, the inner cylinder inner small piston 143 can be fixed to the bottom portion 142b of the inner cylinder piston 142 by the fixing tool 147. Thus, when the inner cylinder piston 142 is charged with the hydraulic fluid 150, the hydraulic fluid 150 can be reliably charged to the capacity limit of the inner cylinder piston 142. Moreover, the worker operates (see a dashed arrow in the figure) the extending body 142d protruding from the body tube 141 to move back and forth in a state in which the hydraulic fluid housing portion 103 is filled with the hydraulic fluid 150 to repeatedly move the inner cylinder piston 142 back and forth in the body tube 141, thereby discharging air from the body tube 141 and the inner cylinder piston 142 and preventing air from remaining in the body tube 141 and the inner cylinder piston 142.

In the above-described embodiment, the volume change compensation device 140 includes the small piston pressing elastic body 144. However, the volume change compensation device 140 can be formed without the small piston pressing elastic body 144.

In the above-described embodiment, the volume change compensation device 140 includes the extending body 142*d*. However, the volume change compensation device 140 can be formed without the extending body 142*d*.

In the above-described embodiment, the worker charges the inner cylinder piston 142 with the hydraulic fluid 150 to the maximum capacity as the capacity limit. However, the worker can charge the inner cylinder piston 142 with the hydraulic fluid 150 to an amount of less than the capacity limit.

In the above-described embodiment, the rotary damper is employed as the damper device 100. However, the damper device according to the present invention can be broadly applied to a damper device including a hydraulic fluid housing portion liquid-tightly housing hydraulic fluid including liquid and a hydraulic fluid pressing body sliding while pushing the hydraulic fluid in the hydraulic fluid housing portion and configured to damp force input to the hydraulic fluid pressing body by the flow of the hydraulic fluid.

In this case, the damper device can be formed as a direct acting type damper device such as a shock absorber. In the direct acting type damper device, a linearly-extending cylindrical cylinder is filled with hydraulic fluid, and a piston rod configured to displace in an axis direction in the cylinder while pushing the hydraulic fluid is provided. In this case, the cylinder is equivalent to the hydraulic fluid housing portion according to the present invention, and the piston rod is equivalent to the hydraulic fluid pressing body according to the present invention. Note that in the above-described embodiment, the movable vanes 126, 127 are equivalent to the hydraulic fluid pressing body according to the present invention.

The volume change compensation device 140 can be broadly applied to equipment or a device including a closed circuit for the hydraulic fluid 150, the closed circuit being connected to the hydraulic fluid housing portion liquid-tightly housing the hydraulic fluid including liquid and compensation for a change in the volume of the hydraulic fluid being necessary for the closed circuit. For example, the volume change compensation device 140 can be used with the volume change compensation device 140 being connected to a closed circuit mounted on a machine tool, a construction machine, a heavy machine, or a clamp device. As the hydraulic fluid 150, liquid other than oil, such as water, can be employed.

In the above-described embodiment, the housing body 102 is formed in a bottomed tubular shape in the housing 101. However, the housing 101 can be configured such that the housing body 102 is formed in a tubular shape and both end portions of this tubular body are closed by plate-shaped bodies equivalent to the lid 110.

In the above-described embodiment, in the damper device 100, the inside of the single hydraulic fluid housing portion 103 is divided into the cell R1, the cell R2, the cell R3, and the cell R4 as the four cells by the fixed vanes 104, 105 and the movable vanes 126, 127. However, it may only be required that the damper device 100 has at least two cells of which capacities are simultaneously decreased by turning of the movable vanes 126, 127 in one direction and are simultaneously increased by turning of the movable vanes 126, 127 in the other direction and has at least two cells of which capacities are simultaneously increased by turning of the movable vanes 126, 127 in one direction and are simultaneously decreased by turning of the movable vanes 126, 127 in the other direction.

That is, it may only be required that the damper device 100 has, in the single hydraulic fluid housing portion 103, at least two cells of which capacities are simultaneously increased upon turning of the rotor 120 in one direction and at least two cells, which are different from the above-described two cells, of which capacities are simultaneously decreased. Thus, the damper device 100 can have, in the single hydraulic fluid housing portion 103, three cells of which capacities are simultaneously increased upon turning of the rotor 120 in one direction and three cells, which are different from the above-described three cells, of which capacities are simultaneously decreased.

In the above-described embodiment, in the damper device 100, the housing 101 is on the fixed side, and the rotor 120 is on the movable side. However, turning of the rotor 120 relative to the housing 101 in the damper device 100 is relative turning. Thus, the housing 101 may be on the movable side and the rotor 120 may be on the fixed side in the damper device 100, needless to say.

In the above-described embodiment, the second bidirectional communication path 131 and the second unidirectional communication path 132 are provided at the movable vanes 126, 127. However, the second bidirectional communication path 131 and the second unidirectional communication path 132 can be provided at the fixed vanes 104, 105.

In the above-described embodiment, the case where the damper device 100 is attached to the swing arm of the two-wheeled self-propelled vehicle has been described. However, the damper device 100 can be used with the damper device 100 being attached to a location (e.g., an opening/closing mechanism of a seat) other than the swing arm at the two-wheeled self-propelled vehicle, a vehicle (a suspension mechanism, a seat mechanism, or an openable door at a four-wheeled self-propelled vehicle) other than the two-wheeled self-propelled vehicle, or a mechanical device, an electrical device, or a tool other than the self-propelled vehicle.

LIST OF REFERENCE SIGNS

R1 to R4 Cell
100 Damper Device
101 Housing
102 Housing Body
102*a* Opening
103 Hydraulic Fluid Housing Portion
103*a* Bottom Portion
103*b* Housing Portion Wall Surface
104, 105 Fixed Vane
106 Seal Body
107 Rotor Support Portion
110 Lid
111 Rotor Support Portion
112*a*, 112*b* Bypass Path
113*a*, 113*b* Adjustment Needle
114*a* to 114*d* Air Vent Hole
115 Bolt
120 Rotor
121 Shaft
122 Support Shaft Portion
123 Connection Portion
124 First Bidirectional Communication Path
125 First Unidirectional Communication Path 125a One-Way Valve
126, 127 Movable Vane
128 Seal Body
131 Second Bidirectional Communication Path
131a One-Way Valve
131b Throttle Valve
132 Second Unidirectional Communication Path
132a One-Way Valve
132b Throttle Valve
140 Volume Change Compensation Device
141 Body Tube
141a Connection Path
142 Inner Cylinder Piston
142a O-Ring
142b Bottom Portion
142c Air Hole
142d Extending Body
143 Inner Cylinder Inner Small Piston
143a O-Ring
144 Small Piston Pressing Elastic Body
145 Inner Cylinder Piston Pressing Elastic Body
146 Plug
146a Through-Hole
147 Fixing Tool
150 Hydraulic Fluid

The invention claimed is:

1. A volume change compensation device connected to a hydraulic fluid housing portion which liquid-tightly houses hydraulic fluid including liquid to compensate for a change in a volume of the hydraulic fluid, the volume change compensation device comprising:
    a body tube formed in a tubular shape and having a first opening which communicates with the hydraulic fluid housing portion, the body tube housing part of the hydraulic fluid;
    an inner cylinder piston formed in a cylindrical shape with a bottom portion and an opened end that is positioned opposite the bottom portion, the inner cylinder piston being slidably provided in the body tube along an axis direction in a state in which the part of the hydraulic fluid is housed;
    an inner cylinder inner small piston slidably provided along the axis direction in the inner cylinder piston;
    an inner cylinder piston pressing elastic body provided in the body tube, the inner cylinder piston pressing elastic body being positioned away from the first opening farther than the inner cylinder piston and elastically pressing the inner cylinder piston toward the first opening; and
    a small piston pressing elastic body provided in the inner cylinder piston and elastically pressing the inner cylinder inner small piston toward the bottom portion of the inner cylinder piston,
    wherein the inner cylinder piston is arranged in such an orientation that the opened end of the inner cylinder piston is closer to the first opening of the body tube than the bottom portion, and
    an air hole for an air flow into the inner cylinder piston is formed at the bottom portion of the inner cylinder piston between the inner cylinder piston pressing elastic body and the inner cylinder inner small piston.

2. The volume change compensation device according to claim 1, further comprising:
    an extending body extending in a bar shape from the bottom portion of the inner cylinder piston and exposed through a second opening of the body tube, the second opening being positioned opposite the first opening.

3. A volume change compensation device connected to a hydraulic fluid housing portion which liquid-tightly houses hydraulic fluid including liquid to compensate for a change in a volume of the hydraulic fluid, the volume change compensation device comprising:
    a body tube formed in a tubular shape and having a first opening which communicates with the hydraulic fluid housing portion, the body tube housing part of the hydraulic fluid;
    an inner cylinder piston formed in a cylindrical shape with a bottom portion and an opened end that is positioned opposite the bottom portion, the inner cylinder piston being slidably provided in the body tube along an axis direction in a state in which the part of the hydraulic fluid is housed;
    an inner cylinder inner small piston slidably provided along the axis direction in the inner cylinder piston;
    an inner cylinder piston pressing elastic body provided in the body tube, the inner cylinder piston pressing elastic body being positioned away from the first opening farther than the inner cylinder piston and elastically pressing the inner cylinder piston toward the first opening; and
    a fixing tool configured to fix the inner cylinder inner small piston to the bottom portion of the inner cylinder piston,
    wherein the inner cylinder piston is arranged in such an orientation that the opened end of the inner cylinder piston is closer to the first opening of the body tube than the bottom portion, and
    an air hole for an air flow into the inner cylinder piston is formed at the bottom portion of the inner cylinder piston.

4. A damper device comprising:
    a hydraulic fluid housing portion which liquid-tightly houses hydraulic fluid;
    a hydraulic fluid pressing body sliding in the hydraulic fluid housing portion while pushing the hydraulic fluid; and
    the volume change compensation device according to claim 1, wherein
    the damper device damps force input to the hydraulic fluid pressing body by a flow of the hydraulic fluid.

5. The damper device according to claim 4, wherein
    the damper device includes a rotary damper, and
    the rotary damper includes:
        a housing having the hydraulic fluid housing portion formed in a cylindrical shape and having, in the hydraulic fluid housing portion, a fixed vane formed in a wall shape along a radial direction, dividing an inside of the hydraulic fluid housing portion, and interfering with the flow of the hydraulic fluid in a circumferential direction,
        a rotor having a shaft and a movable vane provided an outer peripheral portion of the shaft, the movable vane dividing the inside of the hydraulic fluid housing portion and turning while pushing the hydraulic fluid.

6. The damper device according to claim 5, wherein
    the volume change compensation device is located inside the shaft.

7. The damper device according to claim 6, wherein
    the shaft has a communication path allowing the hydraulic fluid to flow between at least two cells divided by the fixed vane in the hydraulic fluid housing portion, and
    the body tube of the volume change compensation device communicates with the hydraulic fluid housing portion through the communication path.

8. The damper device according to claim 4, wherein the inner cylinder piston is filled with the hydraulic fluid to a capacity limit of the inner cylinder piston in an expected temperature environment for the damper device.

9. A damper device comprising:
a hydraulic fluid housing portion which liquid-tightly houses hydraulic fluid;
a hydraulic fluid pressing body sliding in the hydraulic fluid housing portion while pushing the hydraulic fluid; and
the volume change compensation device according to claim 4, wherein
the damper device damps force input to the hydraulic fluid pressing body by a flow of the hydraulic fluid.

10. The damper device according to claim 9, wherein the damper device includes a rotary damper, and the rotary damper includes:
   a housing having the hydraulic fluid housing portion formed in a cylindrical shape and having, in the hydraulic fluid housing portion, a fixed vane formed in a wall shape along a radial direction, dividing an inside of the hydraulic fluid housing portion, and interfering with the flow of the hydraulic fluid in a circumferential direction,
   a rotor having a shaft and a movable vane provided an outer peripheral portion of the shaft, the movable vane dividing the inside of the hydraulic fluid housing portion and turning while pushing the hydraulic fluid.

11. The damper device according to claim 10, wherein the volume change compensation device is located inside the shaft.

12. The damper device according to claim 11, wherein the shaft has a communication path allowing the hydraulic fluid to flow between at least two cells divided by the fixed vane in the hydraulic fluid housing portion, and the body tube of the volume change compensation device communicates with the hydraulic fluid housing portion through the communication path.

13. The damper device according to claim 9, wherein the inner cylinder piston is filled with the hydraulic fluid to a capacity limit of the inner cylinder piston in an expected temperature environment for the damper device.

14. The volume change compensation device according to claim 1, wherein
the small piston pressing elastic body elastically presses the inner cylinder inner small piston away from the first opening.

* * * * *